(12) United States Patent
Kuokkanen

(10) Patent No.: US 8,265,046 B2
(45) Date of Patent: Sep. 11, 2012

(54) SYSTEM AND METHOD FOR GENERIC ACCESS NETWORK REGISTRATION BY A MOBILE STATION DURING NETWORK CONGESTION

(75) Inventor: Mika Kuokkanen, Vesilahti (FI)

(73) Assignee: Nokia Corporation, Espoo (FI)

( * ) Notice: Subject to any disclaimer, the term of this patent is extended or adjusted under 35 U.S.C. 154(b) by 978 days.

(21) Appl. No.: 12/100,789

(22) Filed: Apr. 10, 2008

(65) Prior Publication Data

US 2009/0257412 A1 Oct. 15, 2009

(51) Int. Cl.
*H04W 4/00* (2009.01)

(52) U.S. Cl. .......................... 370/338; 455/436

(58) Field of Classification Search ............ 370/331, 370/338, 352; 455/432.1, 436

See application file for complete search history.

(56) References Cited

U.S. PATENT DOCUMENTS

| | | | |
|---|---|---|---|
| 2006/0116125 A1* | 6/2006 | Buckley et al. | 455/435.1 |
| 2006/0223498 A1* | 10/2006 | Gallagher et al. | 455/410 |
| 2008/0076386 A1* | 3/2008 | Khetawat et al. | 455/410 |

* cited by examiner

*Primary Examiner* — Anh-Vu Ly
*Assistant Examiner* — Matthew Hopkins
(74) *Attorney, Agent, or Firm* — Squire Sanders (US) LLP

(57) ABSTRACT

Systems and methods for providing mobile stations ("MS") registration to a generic access network ("GAN") via a wireless LAN interface are disclosed. The MS may receive a rejection message from a GAN controller with a "network congestion" indication set. The MS may also receive a "connection status" information element as part of the rejection message. The MS can determine from the information element whether the MS can release the connections made to a security gateway ("SEGW") and to the GAN controller and whether it can release its WLAN connection facility. When the MS releases these connections, battery power is conserved while performing a timer decrement loop. At the end of the timer decrement loop, the MS makes another registration request. The network can reallocate resources when the MS releases the connections to the SEGW and the GAN controller. Methods for performing the GAN registration during network congestions are described.

29 Claims, 12 Drawing Sheets

Table 10.1.4.1: GA-RC DISCOVERY REJECT message content

| IEI | Information Element | Type/Reference | Presence | Format | Length | Value | Notes |
|---|---|---|---|---|---|---|---|
|  | Length Indicator | Length Indicator 11.1.1.1 | M | V | 2 |  |  |
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC DISCOVERY REJECT Message Type | Message Type 11.1.1.4 | M | V | 1 |  |  |
| 12 | Discovery Reject Cause | Discovery Reject Cause 11.2.12 | M | TLV | 3 |  |  |
| 24 | TU3902 Timer | TU3902 Timer 11.2.24 | C | TLV | 4 |  |  |
| <u>10</u> 8 | <u>Connection Status</u> | <u>Connection Status</u> | <u>C</u> | <u>TLV</u> | <u>3</u> |  |  |

·10.1.4.2  Connection Status
·The Connection Status IE shall be included if the Discovery Reject Cause 'Network Congestion' is returned to the MS.

FIGURE 9

10.1.8 GA-RC REGISTER REJECT

The GAN uses this message to reject the registration request from a MS.
Direction: GANC to MS

Table 10.1.8.1: GA-RC REGISTER REJECT message content

| IEI | Information Element | Type/Reference | Presence | Format | Length | Value | Notes |
|---|---|---|---|---|---|---|---|
| | Length Indicator | Length Indicator 11.1.1.1 | M | V | 2 | | |
| | GA-RC Protocol Discriminator | Protocol Discriminator 11.1.1.2 | M | V | ½ | 0000 | |
| | Skip Indicator | Skip Indicator 11.1.1.3 | M | V | ½ | 0000 | |
| | GA-RC REGISTER REJECT Message Type | Message Type 11.1.1.4 | M | V | 1 | | |
| 21 | Register Reject Cause | Register Reject Cause 11.2.21 | M | TLV | 3 | | |
| 16 | TU3907 Timer | TU3907 Timer 11.2.16 | C | TLV | 4 | | |
| 58 | Location Black List indicator | Location Black List indicator 11.2.58 | C | TLV | 3 | | |
| 5 | Location Area Identification | Location Area Identification 11.2.5 | C | TLV | 7 | | |
| 108 | Connection Status | Connection Status | C | TLV | 3 | | |

FIGURE 10

11.2.74 Connection Status
This information element indicates whether the MS is requested to disconnect or maintain TCP and secure connection while timer TU3902 is running.
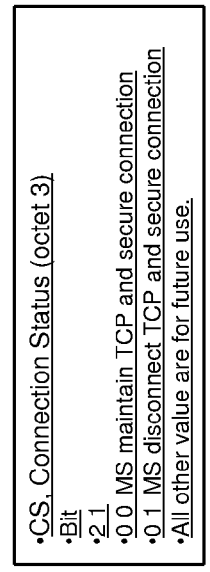
- Figure 11.2.44.1 Location Status information element
- Table 11.2.44.1: Location Status information element
FIGURE 11

SYSTEM AND METHOD FOR GENERIC ACCESS NETWORK REGISTRATION BY A MOBILE STATION DURING NETWORK CONGESTION

TECHNICAL FIELD

The present invention is directed, in general, to communication systems and, more particularly, to a system and method for providing the use of Generic Access Network ("GAN") functions in a packet-based communication system that includes dual-mode transceivers and voice over internet protocol ("VoIP") packet support while allowing for efficient use, simple implementation and conservation of system and mobile station resources.

BACKGROUND

As wireless communication systems such as cellular telephones, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third Generation Partnership Project Long Term Evolution ("3GPP LTE") is the name generally used to describe an ongoing effort across the industry to improve the Universal Mobile Telecommunications System ("UMTS") for mobile communications. The improvements are being made to cope with continuing new requirements and the growing base of users. Goals of this broad-based project include improving communication efficiency, lowering costs, improving services, making use of new spectrum opportunities, and achieving better integration with other open standards, and backwards compatibility with some existing infrastructure that is compliant with earlier standards. The project envisions a packet-switched communications environment with support for such services as VoIP and MBMS. MBMS may support services where base stations transmit to multiple user equipment simultaneously, such as mobile televisions or radio broadcasts, for example. The 3GPP LTE project is not itself a standard-generating effort, but will result in new recommendations for standards for the UMTS.

The UMTS Terrestrial Radio Access Network ("UTRAN") includes multiple Radio Network Subsystems ("RNS"), each of which contains at least one Radio Network Controller ("RNC"). However, it should be noted that the RNC may not be present in the actual implemented systems incorporating Long Term Evolution ("LTE") or UTRAN ("E-UTRAN"). LTE may include a centralized or decentralized entity for control information. In UTRAN operation, each RNC may be connected to multiple Node Bs, which are the UMTS counterpart to Global System for Mobile Communications ("GSM") base stations. In E-UTRAN systems, the eNode B may be, or is, connected directly to the access gateway ("aGW," sometimes referred to as the services gateway "sGW"). Each Node B may be in radio contact with multiple user equipment ("UE") (generally, user equipment includes mobile transceivers or cellular phones, although other devices such as fixed cellular phones, mobile web browsers, laptops, PDAs, MP3 players, and gaming devices with transceivers may also be UE) via the radio Uu interface. In this document, the abbreviation for user equipment ("UE") will be synonymous with the abbreviation for mobile station ("MS"), and MS will be used primarily. MSs may also be cellular phones, PDAs, MP3 players, mobile web browsers, mobile PCs and the like.

The wireless communication systems as described herein are applicable to, for instance, 3GPP LTE compatible wireless communication systems, and of interest is an aspect of LTE, referred to as "evolved UMTS Terrestrial Radio Access Network," or E-UTRAN. In general, E-UTRAN resources are assigned more or less temporarily by the network to one or more UE devices by use of allocation tables, or more generally, by use of a downlink resource assignment channel or physical downlink control channel ("PDCCH"). LTE is a packet-based system and, therefore, there may not be a dedicated connection reserved for communication between a UE and the network. Users are generally scheduled on a shared channel every transmission time interval ("TTI") by a Node B or an evolved Node B ("eNode B"). A Node B or an eNode B controls the communications between user equipment terminals in a cell served by the Node B or eNode B. In general, one Node B or eNode B serves each cell. A Node B may be referred to as a "base station." Resources needed for data transfer are assigned either as one time assignments or in a persistent/semi-static way. The LTE, also referred to as 3.9 G, generally supports a large number of users per cell with quasi-instantaneous access to radio resources in the active state. It is a design requirement that at least 200 users per cell should be supported in the active state for spectrum allocations up to 5 megahertz ("MHz"), and at least 400 users for a higher spectrum allocation.

In addition to support for UTRAN and in the future, E-UTRAN and MS devices presently in production and in development offer a dual-mode function. In the dual-mode function, the MS has the ability to connect to another service such as a wireless local area network ("WLAN") over an access point ("AP"). The term WLAN here generally includes "Wi-Fi" standards such as 802.11b, 802.11g, 802.11n, Bluetooth, and other standards for accessing the public IP network over a wireless interface. APs, sometimes wireless access points ("WAPs") are increasingly found in homes, businesses, university environments and public spaces such as cafes, hotels, libraries, and even on transit systems. As is well known, WAPs can provide an internet "hot spot" where a MS (including a laptop or notebook computer or a cellular phone with advanced features) can access the public IP network. Further, as more users rely on VoIP services for telephone and data transmissions as alternatives to traditionally "wired" telephone services over the public-switched telephone networks ("PSTN"), the dual-mode features of the MS can give the users access to their VoIP services away from home. Many users are abandoning traditionally wired telephones entirely, relying on their MS devices solely for telephone use, at home and away. Dual-mode MS devices provide additional access and features for these users.

Originally referred to as unlicensed mobile access ("UMA"), general access network ("GAN") is the term used by the 3GPP standards for a system that enables mobile phones to make handovers between the cellular network and an IP access network such as WLAN, while carrying voice, data, both voice and data or other information. GAN allows the user of the dual-band mobile phones to access a broadband network.

By providing dual-mode support in MS, the WLAN can be used to extend the coverage of the GSM/GPRS network. In areas where the reception is poor, or the number of base stations or eNode Bs is not sufficient, the MS can register with the WLAN. The MS can provide the user a seamless experience since the user will still be able to access all the voice and data functions in the same manner as if the MS were using the E-UTRAN or UTRAN cellular network. The addition of support for GAN services in the MS should have a minimum impact on the efficiency and operation of the remaining services in the environment, the other MSs, the eNode B devices, the E-UTRAN mobile management entities ("MMEs"), the generic access network controllers ("GANC") for the GAN support and other resources in the system.

SUMMARY OF THE INVENTION

These and other problems are generally solved or circumvented, and technical advantages are generally achieved, by advantageous embodiments of the present invention which include an apparatus and methods according to embodiments for providing MS access management to GAN services.

According to an exemplary embodiment, a communication terminal such as a MS (typically a mobile phone or cellular phone) is provided that may implement a GAN connection function over a WLAN air interface to an access point that may release the WLAN connection, the security gateway ("SEGW") connection, and the TCP connection to the GAN controller when a request rejected message is received from the GANC including certain status fields within an information element that is part of the request rejected message.

According to another exemplary embodiment, a communication terminal such as a MS (typically a mobile phone or cell phone) is provided that may implement a GAN connection function over a wireless LAN ("WLAN") air interface to an access point that may maintain the WLAN connection, the SG connection, and the TCP connection to the GAN controller when a request rejected message is received from the GANC including certain status fields within an information element that is part of the request rejected message.

According to an exemplary method, a mobile station may perform: (a) identifying an AP available for connection over an air interface by a radio transceiver mobile station; (b) making a secure connection to a security gateway over the air interface via the AP; (c) using the secure connection, making a connection to a GANC over the air interface; (d) making a request to register with the generic access controller; (e) receiving a request rejected message from the generic access controller; (f) receiving a rejection cause field from the message; (g) determining a connection status field from the rejection cause field of the message; (i) if the connection status field indicates the connection is to be released, releasing the connection to the GANC and the gateway; (j) if the connection status field indicates the connection is to be maintained, maintaining the connections to the GANC and the gateway.

According to another exemplary embodiment, a mobile station may perform the method above and further perform: (k) waiting for an elapsed time; and (l) repeating steps (a)-(j).

According to another exemplary embodiment, a mobile station may perform the method above and further perform: (m) repeating steps (a)-(l) until a predetermined maximum number of attempts is reached; and (n) releasing the connection to the SEGW and to the generic access controller.

According to another exemplary embodiment, a mobile station may perform the method above and further perform: receiving a timer value from the message; loading a timer with the timer value; and decrementing the timer until the timer reaches an end condition.

According to another exemplary embodiment, a method is performed: (a) providing a MS having a spread spectrum radio transceiver for connecting to a WLAN over an air interface via a WLAN AP; (b) identifying an AP available for connection by the MS; (c) making a secure connection to a SG via the AP; (d) making a transmission control protocol ("TCP") connection to a GANC via the secure connection; (e) sending a message one selected from the group of a 'DISCOVERY REQUEST' message and a 'REGISTER REQUEST' message to the GANC from the MS; (f) receiving in response at the MS a respective one of a 'DISCOVERY REJECT' message and a 'REGISTER REJECT' message, respectively, from the GANC; (g) extracting a 'Reject Cause' information element ("IE") from the message; (h) determining that the IE indicates a "network congestion" condition; (i) extracting a 'Connection Status' IE from the message; (j) if the 'Connection Status' indicates "disconnect," releasing the secure connection to the SEGW and the TCP connection to the GANC; and (k) if the 'Connection Status' indicates "maintain," maintaining the secure connection to the security gateway and the TCP connection to the GANC.

According to another exemplary embodiment, the method above is performed and further performing: (l) extracting a Timer Value IE from the message; (m) loading a timer TU3902 with the Timer Value; and (n) repeatedly decrementing timer TU3902 until an end condition is met.

According to another exemplary embodiment, the method above is performed and further performing: (o) if the 'Connection Status' extracted in (i) indicated "disconnect," repeating (c) through (n);

(p) if the 'Connection Status' extracted in (i) indicated "maintain," repeating steps (e) through (n).

According to another exemplary embodiment, the method above is performed and further performing: (r) extracting a Timer Value IE from the message; (s) loading a timer TU3907 with the Timer Value; and (t) repeatedly decrementing timer TU3907 until an end condition is met.

According to another exemplary embodiment, the method above is performed and further performing: (u) if the 'Connection Status' extracted in (i) indicated "disconnect," repeating (c) through (k) and (r) through (t); and (v) if the 'Connection Status' extracted in (i) indicated "maintain," repeating steps (e) through (k) and (r) through (t).

According to another exemplary embodiment, the method above is performed and further performing: identifying a network element available for connection over a spread spectrum radio frequency air interface via a cellular telephone network; and connecting the MS to the network element using a spread spectrum radio frequency transceiver in the MS.

According to another exemplary embodiment, the method above is performed wherein the WLAN is an 802.11 compliant wireless LAN. In another exemplary embodiment the method above is preformed wherein the WLAN is a Bluetooth compliant LAN.

According to another exemplary embodiment, an apparatus is provided comprising: a radio frequency circuit configured to transmit and receive spread spectrum radio frequency signals over an air interface to and from a wireless LAN AP; SEGW connection circuitry configured to make a secure connection to a SEGW via the AP over the air interface; generic access connection circuitry configured to make a TCP connection to a GANC over the SEGW connection; message send circuitry configured to send a message one selected from the group of 'DISCOVERY REQUEST' and 'REGISTER REQUEST' to a GANC over the air interface; message receive circuitry configured to receive a message one selected from the group of 'DISCOVERY REJECT' and 'REGISTER REJECT' from the GANC over the air interface; information element ("IE") extraction circuitry configured to extract a "reject cause" IE from a received message; IE extraction circuitry configure to extract a "connection status" IE from a received message containing a "reject cause;" determination circuitry configured to determine if the "connection status" IE indicates a "maintain" or a "disconnect" status; maintain connection circuitry configured to maintain the secure connection and the TCP connection if the determination circuitry indicates a "maintain" status; and release connection circuitry configured to release the secure connection and the TCP connection if the determination circuitry indicates a "disconnect" status.

According to another exemplary embodiment, the above apparatus is provided and further comprising: timer circuitry configured to decrement a timer value responsive to a control signal; and comparison circuitry configured to indicate when the timer value reaches an end value.

According to another exemplary embodiment, the above apparatus is provided and further comprising: a second radio frequency receiver circuit configured to receive spread spectrum modulated signals over an air interface from a network element; wherein the second radio frequency receiver circuit selectively operates simultaneously with the radio frequency receiver circuit.

According to another exemplary embodiment, an apparatus is provided comprising: an analog front end circuit configured to receive spread spectrum modulated radio frequency signals; a radio frequency receiver circuit configured to receive analog signals from the analog front end; an analog baseband circuit configured to receive analog signals from the radio frequency receiver and performing analog to digital conversion; and a digital baseband circuit configured to receive digital signals from the analog baseband circuit; wherein the digital baseband circuit receives a request rejected message from a GANC, determines a reject cause field received in the message is indicating a network congestion condition, determines a connection status field received in the request rejected message, and based on the value of the connection status field being a first value releases a connection to the GANC.

According to another exemplary embodiment, the above apparatus is provided wherein the digital baseband circuit further comprises a timer circuit configured to load a timer value from the request rejected message received.

According to another exemplary embodiment, the above apparatus is provided wherein the digital baseband controller decrements the timer circuit until an end value is reached.

According to another exemplary embodiment, the above apparatus is provided wherein the digital baseband circuit is a single integrated circuit.

According to another exemplary embodiment, the above apparatus is provided wherein the analog baseband circuit is a single integrated circuit.

According to another exemplary embodiment, the above apparatus is provided wherein the digital baseband circuit is a digital signal processor.

According to another exemplary embodiment, the above apparatus is provided wherein the analog front end, the radio frequency receiver, and the analog baseband circuit are disposed on a first single integrated circuit.

According to another exemplary embodiment, a computer readable storage medium is provided comprising executable instructions that, when executed by a programmable MS having a spread spectrum radio transceiver for connecting to a WLAN over an air interface via a WLAN AP perform: (a) identifying an AP available for connection by the MS; (b) making a secure connection to a SEGW via the AP; (c) making a TCP connection to a GANC via the secure connection; (d) sending a message one selected from the group of a 'DISCOVERY REQUEST' message and a 'REGISTER REQUEST' message to the GANC from the MS; (e) receiving in response at the MS a respective one of a 'DISCOVERY REJECT' message and a 'REGISTER REJECT' message, respectively, from the GANC; (r) extracting a 'Reject Cause' IE from the message; (g) determining that the IE indicates a "network congestion" condition; (h) extracting a 'Connection Status' IE from the message; (i) if the 'Connection Status' indicates "disconnect," releasing the secure connection to the gateway and the TCP connection to the GANC; and (j) if the 'Connection Status' indicates "maintain," maintaining the secure connection to the gateway and the TCP connection to the GANC.

According to another exemplary embodiment, an apparatus is provided comprising: means for receiving a message one selected from the group of 'DISCOVERY REJECT' and 'REGISTER REJECT' from a GANC over the air interface of a wireless LAN AP; means for extracting IE extraction for extracting a "reject cause" IE from the received message; means for extracting a "connection status" IE from a received message containing a "reject cause"; means for determining if the "connection status" IE indicates a "maintain" or a "disconnect" status; means for maintaining a secure connection, and a TCP connection to the GANC if the determining indicates a "maintain" status; and means for releasing the secure connection and the TCP connection if the determining indicates a "disconnect" status.

The foregoing has outlined rather broadly the features and technical advantages of certain exemplary embodiments of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. For example, some of the terms used in the foregoing, the description that follows and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which:

FIG. 9 illustrates an exemplary embodiment of a modified 3GPP/GAN GA-RC DISCOVERY REJECT message that incorporates features of the present invention;

FIG. 10 illustrates an exemplary embodiment of a modified 3GPP/GAN GA-RC REGISTER REJECT message that incorporates features of the present invention;

FIG. 11 illustrates an exemplary embodiment of a connection status IE field that incorporates features of the present invention.

The drawings are illustrative, presented for aid in comprehension, and are not drawn to scale.

DETAILED DESCRIPTION

Figure 1:
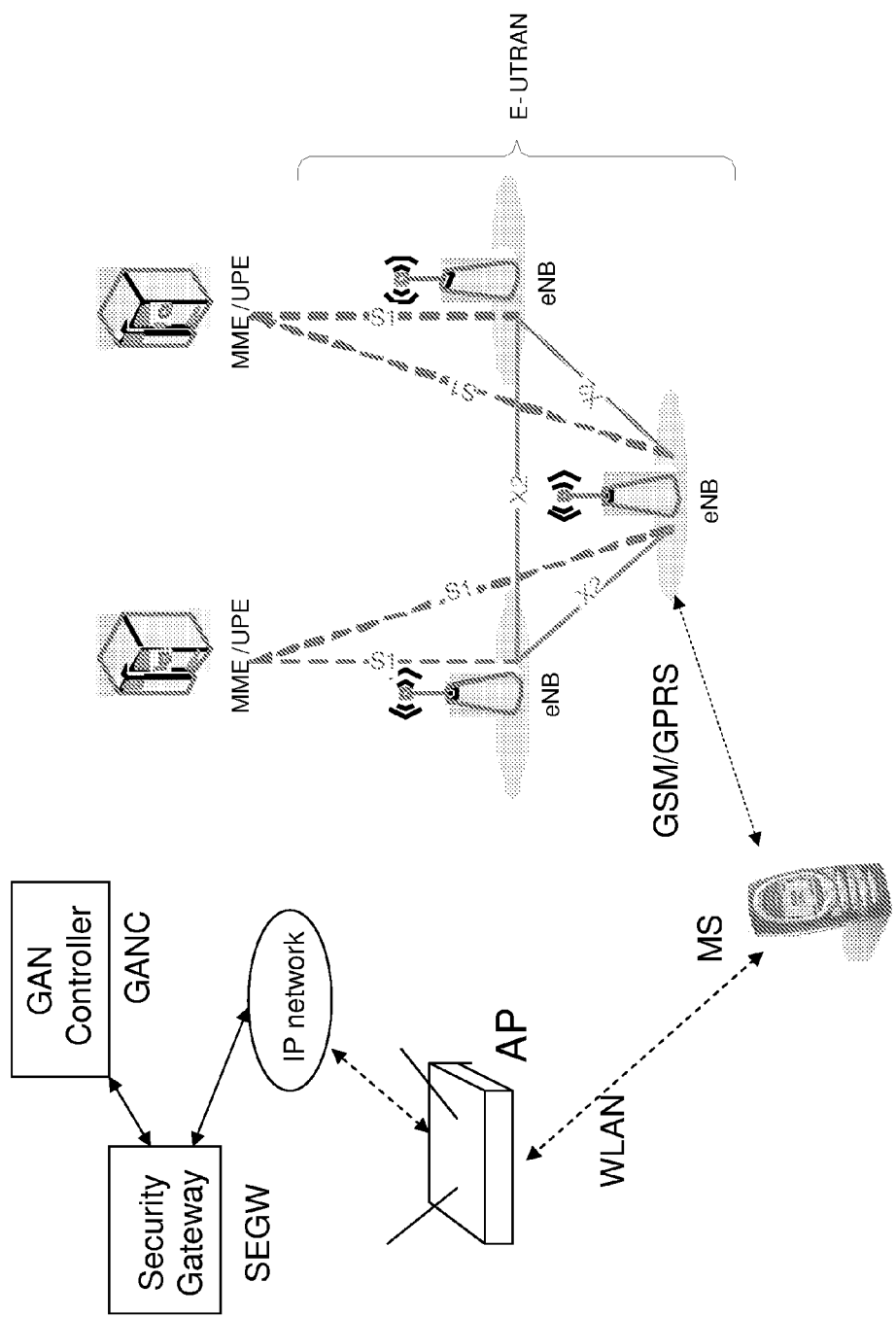
FIG. 1 illustrates mobile station user communication equipment MS communicating to one of several eNode B base stations over an air interface, communicating to a WLAN over another air interface, a GANC, a SEGW, and an E-UTRAN communications system according to an advantageous embodiment of the present invention.

FIG. 1 illustrates in a system level diagram a communication system including a wireless communication system that provides an environment for the application of the principles of the present invention. The wireless communication system provides an E-UTRAN architecture including cellular base stations (designated in the LTE 3GPP nomenclature as eNode B or "eNBs") providing E-UTRAN user plane (packet data convergence protocol/radio link control/media access control/physical transport) and control plane (radio resource control) protocol terminations directed towards mobile station user equipment (designated as "MS"). The base stations are interconnected with an X2 interface or communication link. The base stations are also connected by an S1 interface or communication link to an evolved packet core ("EPC") including, for instance, a mobility management entity ("MME") and a user plane entity ("UPE"), which may form an access gateway ("aGW," a system architecture evolution gateway). The S1 interface supports a multiple entity relationship between the mobility management entities/user plane entities and the base stations and supports a functional split between the mobility management entities and the user plane entities.

The base stations may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), measurement and reporting configuration for mobility and scheduling. The mobility management entity/user plane entity may host functions such as distribution of paging messages to the base stations, security control, terminating user plane ("U-plane") packets for paging reasons, switching of U-plane for support of the user equipment mobility, idle state mobility control, and system architecture evolution bearer control. The MS receives an allocation of a group of information blocks from the base stations.

In addition, the MS illustrated in FIG. 1 is a dual-mode MS that has WLAN capability. Using an air interface such as Wi-Fi or Bluetooth, the MS can register with a GANC through AP and security gateway SEGW. Because the network provides all of the services listed above for the MME/U-plane, the user experiences the same services as are available from the GSM/GPRS air interface. Accordingly the use of the WLAN services can provide coverage for the MS in areas that are not covered, or in areas where the GSM/GPRS network is out of cells (too many MS stations are already using the available bandwidth), and further the MS may access the WLAN at the users home or place of work where the economics may determine a lower cost basis for the user when using the WLAN, for instance to use VoIP service for voice calls.

In order to understand the manner in which the MS connects with the GAN controller to use the WLAN services, the present standard proposals will be presented first. Further, to enhance understanding and to ensure the reader understands that the exemplary embodiments of the present invention are broad in scope and not limited to any particular standards, the connection process is first described in general terms and then, the present 3GPP terminology will be used to again describe the process. The exemplary embodiments that advantageously modify these approaches to improve the performance of the system are described in detail below.

In the present approach, when the MS wants to register with the GAN, an attempt to register is made by transmitting a request to an access point AP. The MS will receive messages back from the GANC. In the particular example of interest here, the MS will be informed that the request is rejected. Specifically, the request is rejected because of a resource limitation, either too many MS devices are registered with the network controller, or perhaps the AP has been configured to only support a limited number of MS stations, and the numerical limit is already met. The 3GPP/GAN protocols define a reject cause condition of "network congestion." This message may be sent to the MS if the number of GAN registered MS needs to be limited, if the maximum number of MS are already registered with a GANC or if the amount of MS that are registered needs to be decreased due to network problems or prioritization. The GANC can also use this message to limit the number of MS that are registered via a particular WLAN access point.

The MS then executes a series of steps. A timer is set to a value that is determined, typically, by a combination of a random number which is added to a value that may be preconfigured, or transmitted by the GANC in the response message. When the timer expires, the MS makes another request for registration. During the time that the timer is being counted down, the MS maintains connection to the network in the form of a secure connection to the security gateway SEGW and a TCP connection to the GANC; further the WLAN facility in the MS remains active.

The present GAN registration approach requires the MS, the GANC and the SEGW to dedicate resources that cannot be effectively used during the time the MS waits to make another request. For the MS this is particularly problematic because the MS is a mobile device typically running on a battery. By keeping the WLAN facility active, the MS is using substantial battery power during a time when the facility cannot be used (the countdown timer is active). The timer, as presently proposed, may have a value up to 65536 seconds, so the battery consumption during a time when the WLAN facility is otherwise unavailable is potentially great. Also, the MS will typically attempt to use the E-UTRAN GSM/GPRS facility to access the network while the WLAN facility is not available, so that additional battery power is being used.

In the present approach, the network controller GANC and the security gateway SEGW also must dedicate resources to keep their connections to the MS—even while rejecting the registration of the MS. These resources are needlessly occupied as the MS cannot register until the countdown timer expires, yet the network, and specifically the GAN controller and the security gateway, both have to keep connections to the MS active.

Figure 2:
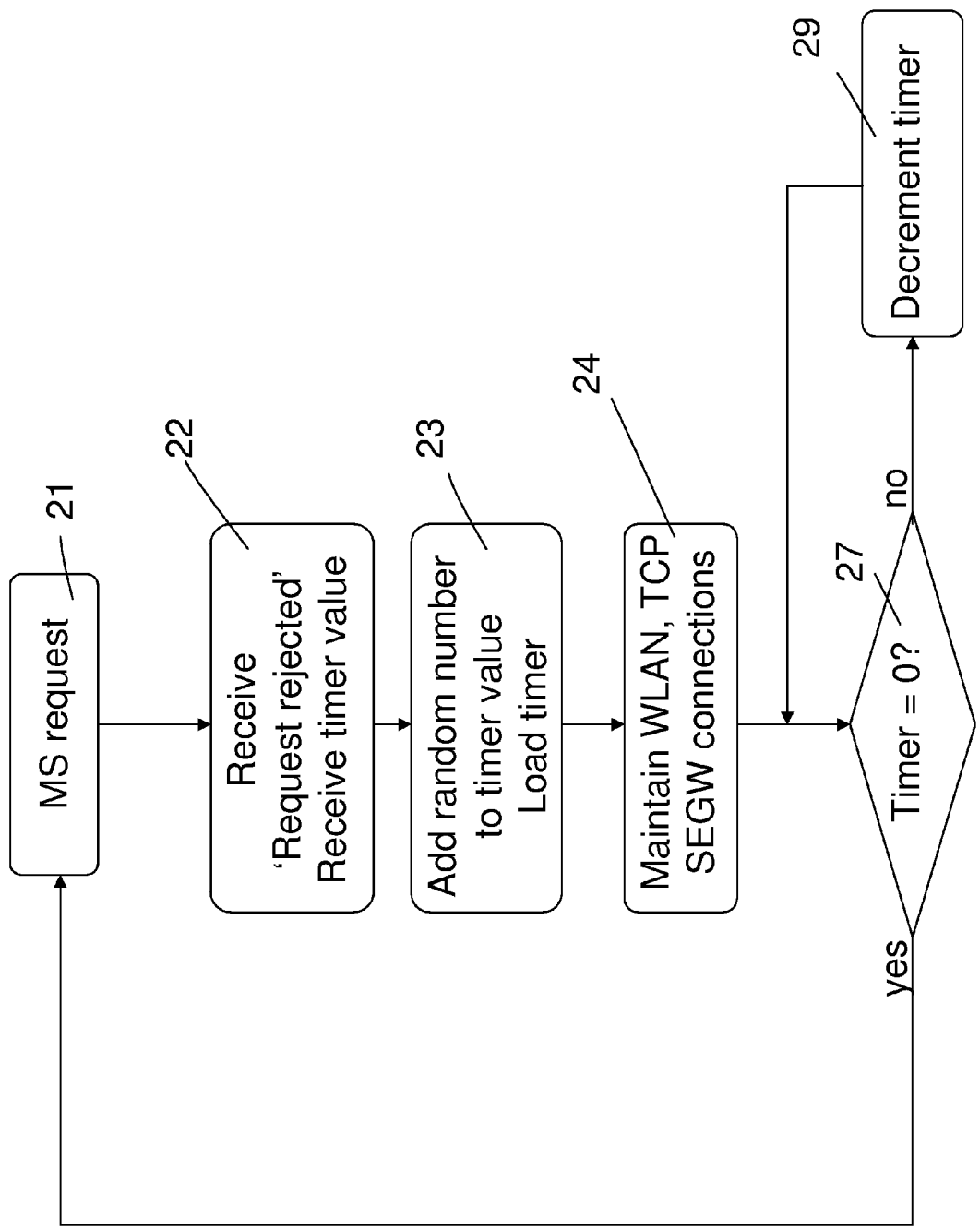
FIG. 2 illustrates in a state diagram a simplified state transition for a MS using a present approach to GAN registration.

FIG. 2 illustrates a very simplified state diagram illustrating the series of steps the MS executes in the above described example, depicting how the present MS requests work. In FIG. 2, the MS requests access to a GAN controller in state 21. In the particular case of interest, in state 23, the request is rejected. A timer value is sent to the MS as part of the rejection message. In this example the reason for the rejection message is "network congestion." In state 25, the MS generates a random value between zero and some other value, and this random value is added to the timer value and a countdown timer is loaded. In state 27 the MS maintains the WLAN facility and the TCP and SEGW connections to the GAN controller and the SG, and transitions to state 31. In state 31 the timer is checked against an end value, typically zero, and if the timer has reached that end value, the state transitions back to the request state, state 21, and another request is made. If the countdown timer has not reached the end value, the MS state transitions to state 33, where the timer is decremented. The state then transitions back to state 27 and the MS maintains the resources allocated for the WLAN facility, the TCP connection and the SEGW connection. This timing loop continues until the timer reaches the end value, when another request is made.

As can be seen from this very simple state diagram, during the timing loop the MS is using battery power to maintain the WLAN facility. Also, several resources are maintained by both the MS and the GANC and SEGW. This limits the activity of the GANC and the access point AP needlessly. In the MS, battery power is consumed at a fairly significant level.

This series of steps will now be described in more detail and with particular reference to the 3GPP standard terminology. However, the exemplary embodiments of the invention detailed below are not limited to 3GPP systems but may be advantageously used in systems where mobile stations with dual band capability need to access a network resource.

The GAN protocols for 3GPP are documented under the 3GPP Technical Specifications' (TS) 43.318 and TS 44.318. TS 44.318 define a discovery request rejection cause, and a registration request rejection cause. When the GANC sends to the requesting MS the rejection message, it can include a 'cause' field. One of the defined cause fields is "network congestion."

To access the WLAN services, an unconnected MS with WLAN capability must first go through what is termed a "discovery" procedure, and then, a "registration" procedure to make a connection to a serving GANC that will provide the network connections and resources needed by the MS. In order that the transactions over the interface to the GAN are secure, the MS must set up an internet protocol security based VPN connection via an SEGW that might be physically part of, or separate from a GAN controller GANC.

When a MS with WLAN capability (including, for example, Wi-Fi, BT or Bluetooth) is within range of an access point, to make a connection it must first identify the address of a GANC known as the "default GANC." This information is "discovered" by means of a "discovery request" from the MS.

The MS will first connect to a "provisioning GANC" in the MSs Public Land Mobile Network ("PLMN"). This connection will be made via the SG associated with the provisioning GANC. The address of the provisioning GANC and the associated SEGW are usually already provided to the MS in the form of an IP address, or a Fully Qualified Domain Name ("FQDN") stored, for example, in a subscriber information module ("SIM card") issued to the user by the service provider. Alternatively, the MS can obtain the FQDN using known procedures.

Once connected to the provisioning GANC, the MS derives the address of the default GANC and its associated security gateway or SEGW, and then attempts to make a connection with the default GANC by "registration." If the registration is successful, the default GANC may become the service GANC for the MS. Alternatively, the default GANC may direct the MS to connect to another service GANC. Once the phone is registered with the GAN it may maintain the GAN connection indefinitely while moving around inside the network of APs and the network will direct signaling traffic to the MS via the GAN instead of via the cellular or UTRAN or E-UTRAN network, so long as the MS is on the GAN. The MS can move back and forth between the two interfaces as the equipment moves physically from areas where one or the other facility is more available. If both the UTRAN network and the WLAN network facilities are available, a dual band phone may be connected in both ways or, the user may input a preference to connect in one manner or the other, depending on the costs and subscriber services the user is subject to and wants to use.

The MS therefore makes two distinct types of requests to a GANC, either of which may be rejected due to a reject cause type "network congestion." The first request is a "discovery request." The second request is a "registration request" to the default GANC after the MS "discovers" the address of the default GANC. In a third possible scenario, the GANC may send a "re-register" message with "network congestion" as the cause.

Figure 3:
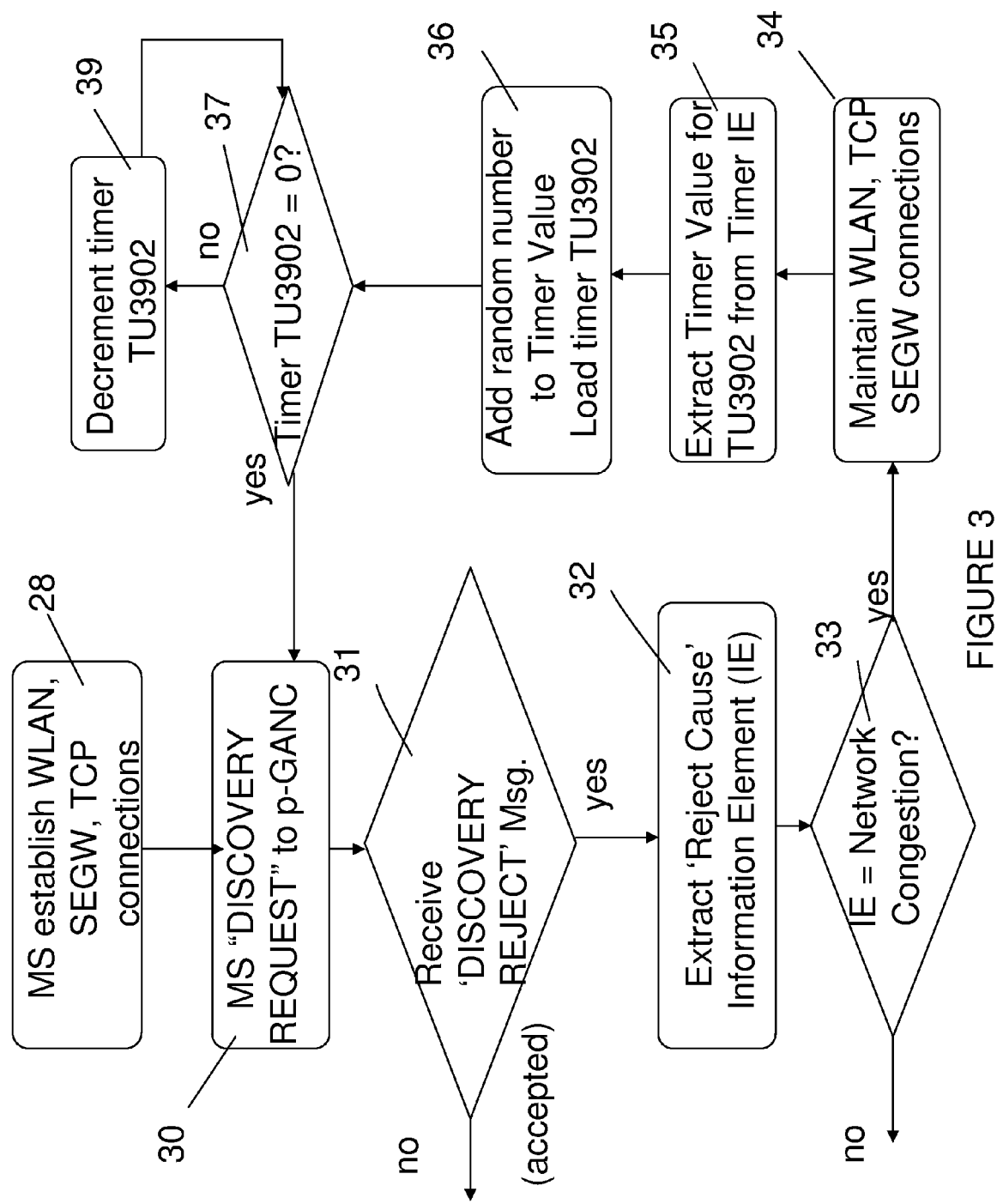
FIG. 3 illustrates in a state diagram a simplified state transition for a MS using a present approach to a 'discovery request' under a 3GPP/GAN protocol.

FIG. 3 depicts a state diagram illustrating the MS request situation using 3GPP terminology for 3GPP/GAN system operation for a MS making a "discovery request," where the request is rejected due to the cause of network congestion.

In FIG. 3 the MS begins in state 28. In the protocols provided by the 3GPP/GAN standard, a MS wishing to connect to the network through an available AP will first establish a secure connection to a SEGW associated with a provisional GANC, and, will further establish a TCP connection to the provisional GANC. In state 28, the MS begins from a disconnected state by forming a connection to first, the AP over the WLAN air interface, then a secure connection to the SEGW that is associated with the AP, and finally a TCP connection to the GAN controller that is associated with the SEGW. After this WLAN, SEGW and TCP connection is formed, the MS transitions to state 30, making a "discovery request" to a provisional GANC. In state 31, the MS requests that the provisional GANC provide the MS information to allow it to connect to a default GANC for the AP.

In FIG. 3 the MS state diagram then transitions to state 31, where the MS determines whether the response received from the GANC is a 'DISCOVERY REJECT' message. For the situations addressed by the exemplary embodiments described below, the MS will receive the reject message. If the response message the MS receives is not a reject message, the state transitions to an accepted state or other states that cover situations not further considered in this work.

In FIG. 3 the MS state diagram next transitions to state 32, where the MS will extract an IE from the response message received in state 31. Under the 3GPP/GAN protocols, messages from the GANC to the MS may have information fields attached to them; these are provided in a standard protocol form as IE fields. Paragraph 5.5.2 of the 3GPP TS 44.318 provides that when a "DISCOVERY REJECT" message is received, the MS should extract the "Reject Cause" IE and determine if the reject cause string has a value that matches the "network congestion" condition. For situations of interest to this work, the MS will receive a reject cause IE from the GANC that indicates "network congestion." If the reject cause is other than a "network congestion" condition, the state diagram transitions to another state that covers conditions not further considered in this work.

In FIG. 3 the MS next transitions to state 34. In state 34, the MS performs the steps specified by paragraph 5.5.2 for the "network congestion" condition in the "Reject Cause" IE; which are to maintain the secure connection to the SEGW associated with the GANC, and maintain the TCP connection to the GANC.

In FIG. 3 the MS next transitions to state 35, where the MS extracts a "timer value" for a timer designated TU3902 from the "timer IE" which is another IE field in the "DISCOVERY REJECT" response message the MS received in state 31. This value may set the timer TU3902 to a value between 0 and 65536 seconds. Paragraph 5.5.2 of TS 44.318 further provides that the MS should generate a random value between 0 and the timer value from the timer IE field, and add that value to the timer value. In state 36 of FIG. 3, the timer TU3902 is loaded with this sum value.

In FIG. 3 the MS state diagram now transitions to a timer decrement loop of states 37 and 39. In state 39, the value of the timer is compared to an end value, for example zero, and if the end condition is met, the state diagram transitions back to state 30, the "DISCOVERY REQUEST" state and the request cycle begins again. If the timer is not at the end condition, the state diagram transitions to state 39, timer TU3902 is decremented and the state transitions back to the end condition test in state 37. This loop continues until the timer value reaches the end condition. The MS then transitions back to state 30 and issue a new DISCOVERY REQUEST message to the GANC. Note that because the connection is maintained in state 34, there is no need for the MS to transition back to state 28. In this non-limiting example, the MS is still connected to the WLAN, the SEGW and the TCP connection is maintained.

In an example transaction in a real system, the operation depicted in FIG. 3 has certain implications for both the network and the MS trying to access the WLAN through an AP and a GAN controller. Consider a case study. In this environment, there are two APs and each AP is limited to 35 GAN users. Each AP already has the maximum amount of GAN users registered. In addition there are MSs trying to access the WLAN over each of these APs. For AP 1, there are 20 additional MSs attempting registration. For AP 2, there are 15 additional MSs attempting registration. In this example assume timer TU3902 is set to 4 minutes in length. There are a total of 35 MSs trying connection to the network Each of these MS has established a secure connection to a SEGW and a TCP connection to the GANC even though registration is not possible (since the maximum number of GAN registrations is already met) through either of these APs. The network and the MSs are using resources that are not available for other APs.

For example, assume an MS 1 tries to register connection through AP 2. The network rejects a "DISCOVERY REQUEST" with the Reject Cause IE indicating "network congestion." After several attempts and one hour of time elapses, the MS finally gets to register with the GAN. Throughout this period, the MS has its WLAN active; even though because the connection was not successful, the MS also connected to the network on the GSM or 3 G network. The battery consumption for the MS during this time is very high.

After the MS completes the "DISCOVERY REQUEST" with the provisioning GANC, the MS will attempt registration with the default GANC for the AP as indicated by the provisioning GANC. A "Registration rejection" from the GANC in this situation is covered in the 3GPP TS 44.318 paragraph 6.2.3.3. This paragraph provides that when the MS receives the GA-RC REGISTER REJECT is should extract the "Register Reject Cause" IE and determine if the cause is "network congestion"; in the same manner as for the "DISCOVERY REQUEST." This situation is depicted in FIG. 4.

Figure 4:
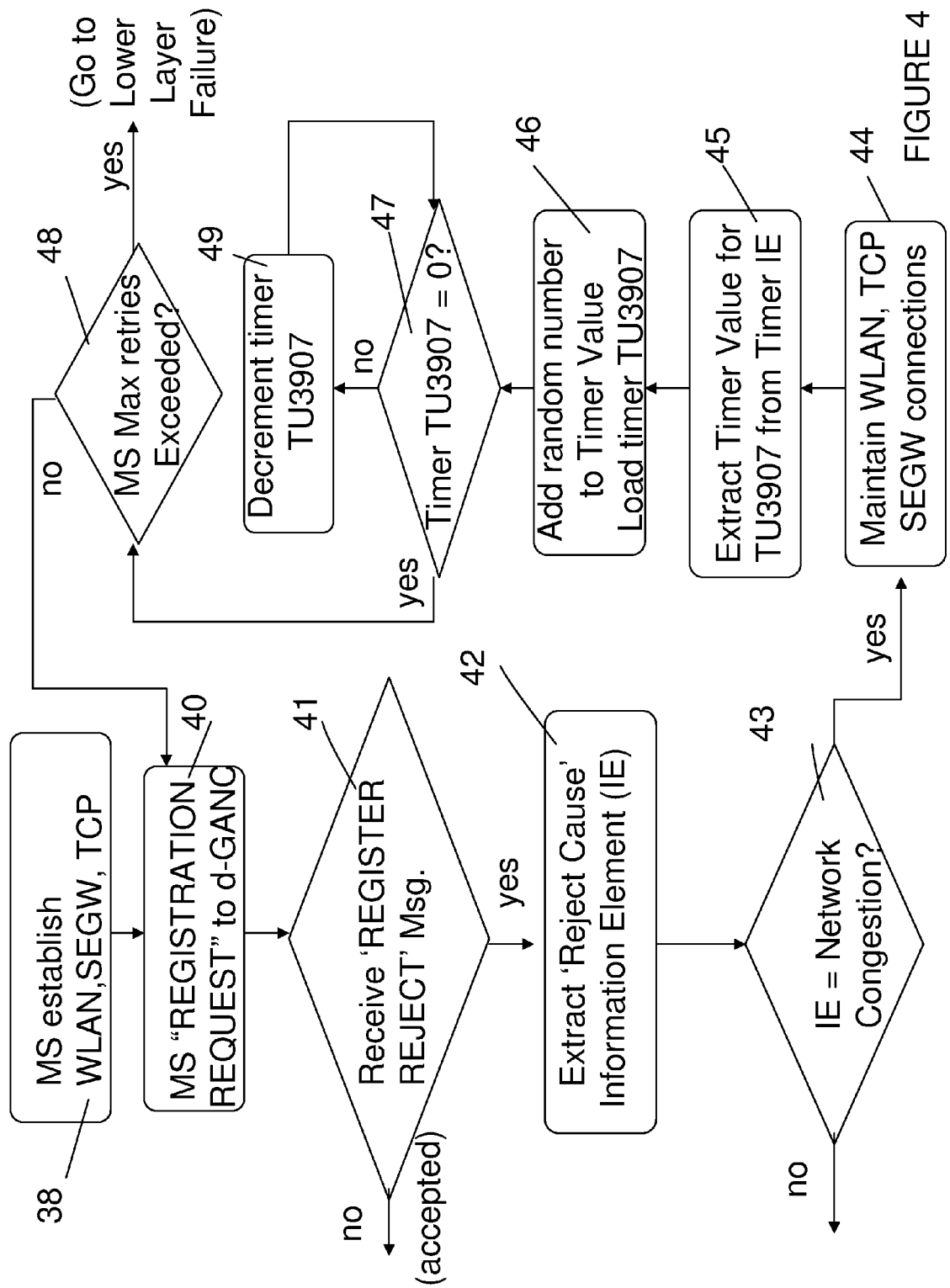
FIG. 4 illustrates in a state diagram a simplified state transition for a MS using a present approach to a 'register request' under a 3GPP/GAN protocol.

In FIG. 4, the MS state transition diagram begins in state 38 where the MS establishes a connection to the AP using the WLAN and makes a secure connection to the SEGW and forms a TCP connection to the GANC. In state 40; the MS makes a "REGISTRATION REQUEST" to the default GANC. The MS state then transitions to a condition state 41, where the MS examines the response message received from the GANC. In state 41, the MS determines if the message received is a "REGISTER REJECT" message. If the message is other than a "REGISTER REJECT" message, the state transitions to a state where conditions such as REGISTER ACCEPTANCE are covered, but these situations are not addressed in this work.

In the case where a REGISTER REJECT message is received by the MS, in state 42 the MS extracts the "reject cause" IE. This IE is part of the message received in state 41. In state 43, the MS again conditionally tests the "reject cause" IE. Assuming that the cause is "network congestion," the state diagram then transitions to state 44. If the cause is other than network congestion, the state diagram would transition to states where the other conditions are covered, but this work is directed to the "network congestion" situation.

The states in FIG. 4 depict the state transitions the MS performs to implement the provisions of 3GPP TS 44.318 paragraph 6.2.3.3. When the "network congestion" condition is indicated by the "reject cause" IE in the "REGISTER REJECT" message, the MS is to maintain the WLAN, the secure connection to the SEGW and the TCP connection to the GANC, as shown in state 44. The MS state diagram then transitions to state 45, where the a timer value is extracted for a timer designated TU3907, the value is located in the Timer IE field in the REGISTER REJECT message the MS receives in state 41.

In FIG. 4 the MS state diagram now transitions to state 46. In state 46 the MS generates a random value between zero and the value from the Timer IE field, this random value is added to the value extracted from the Timer IE field, and this sum is loaded into the timer TU3907. These steps are also specified in paragraph 6.2.3.3 of the 3GPP TS 44.318.

In FIG. 4 the MS state diagram next transitions to a timing loop comprised of state 47 and 49. In state 47, the timer value TU3907 is tested against an end condition, for example timer equal zero, and if the condition is met, the state diagram transitions to state 48. If the timer is not yet decremented to the end condition, the state diagram transitions to state 49, the timer TU3907 is decremented, and the state diagram for the MS transitions back to state 47, where the timer end condition is again tested. This timing loop continues until the timer reaches the end condition and the state diagram transitions to state 48.

In FIG. 4, the MS state diagram transitions to state 48 and a maximum count is tested. When the MS cannot register with the default GANC, a count is updated and if the MS count reaches a maximum value, the state diagram transitions to a "Lower Layer Failure" condition. This part of the state diagram shows how the MS performs the protocols described in paragraph 6.2.4.2, 'Lower Layer Failure' where the MS releases the TCP connection to the GANC and secure connection to the SEGW; and the registration request continues. If the number of failed registration requests continues to grow until another count is exceeded, the MS will transition to a state described in paragraph 6.2.4.5, 'Registration Failure', where the MS will then transition back to a new 'DISCOVERY REQUEST.'

In FIG. 4, if the "MS Max" retries exceeded test of state 48 is not met, the MS state diagram returns again the MS REGISTRATION REQUEST state 40. As described above for the DISCOVERY REQUEST states depicted in FIG. 3, the MS will continue to maintain the WLAN facility, the secure connection to the SEGW, and the TCP connection to the GANC throughout the time the MS decrements the timer TU3907; even though during that time there is no opportunity for the registration to occur. From a network point of view, the GANC controller is also maintaining the secure connection through the associated SEGW and the TCP connection, even though registration is not possible. In the state diagram of FIG. 4, additional signaling is performed at state 48 and in the "Lower Layer Failure" and "Registration Failure" scenarios but the basic problem of wasted resources and excessive battery consumption by the MS remains similar to the state diagram of FIG. 3.

An additional scenario that occurs is when the MS is registered with a GAN controller but receives a "RE REGISTER" message from the generic access resource controller ("GA-RC") of the GAN with the reason in the "cause" IE field as "network congestion". This situation is very similar to the "REGISTER REJECTED" state diagram presented in FIG. 4, again the MS will maintain connections and the WLAN facility will be active while a timer is decremented. Also the network will maintain the connections to the MS while a timer is decremented; even though registration of the MS is not available during that time.

Figure 5:
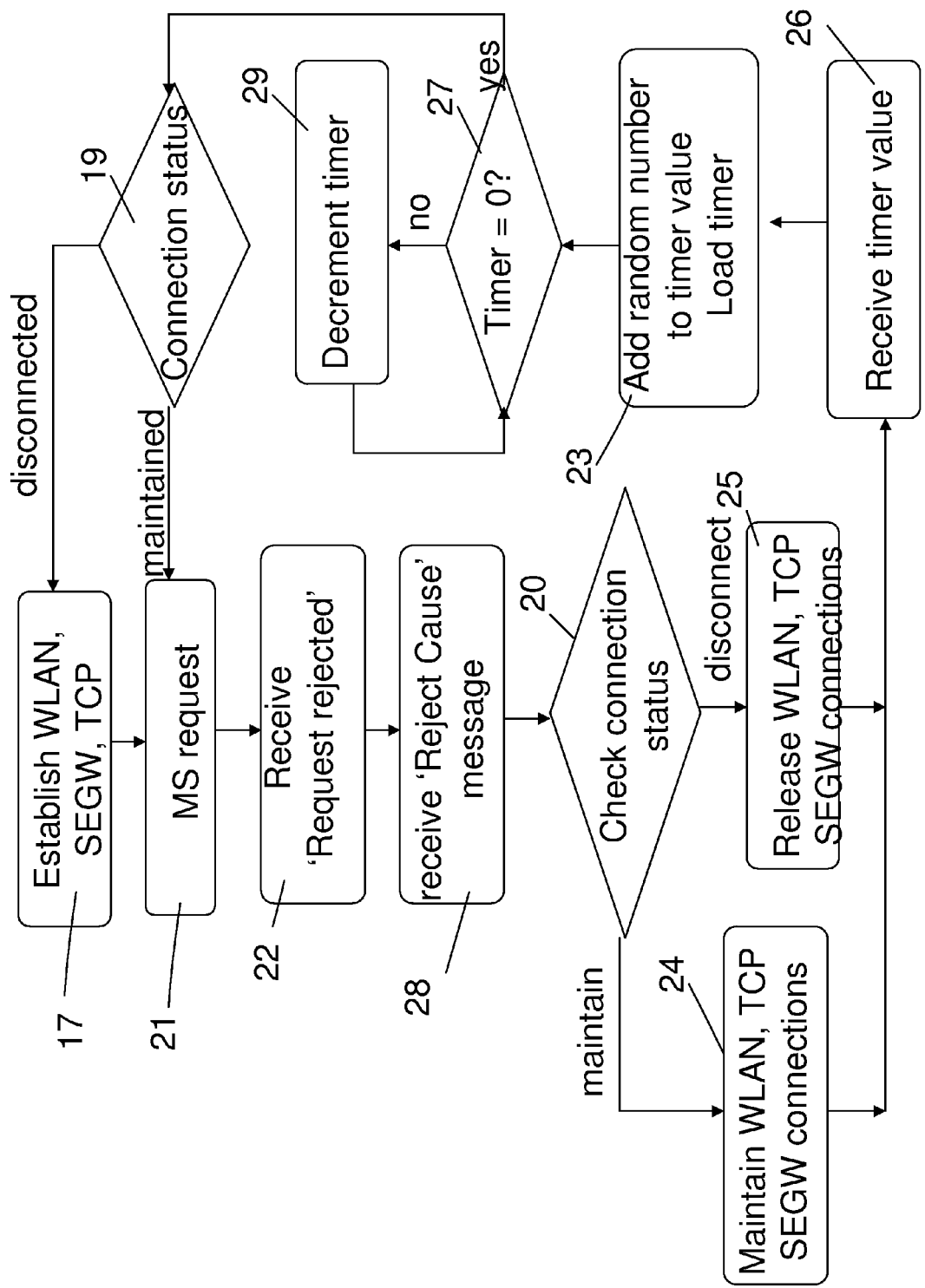
FIG. 5 illustrates in a simplified state diagram an MS performing state transitions that incorporate in an exemplary embodiment features of the GAN registration of the present invention.

A first exemplary embodiment of a method to provide a MS that registers with a GAN and advantageously provides reduced wasted resources and reduced battery consumption in the mobile is illustrated in FIG. 5. FIG. 5 is a simplified state diagram that illustrates in a generic example some of the features of the invention.

FIG. 5 has several states in common with the simplified MS diagram of FIG. 2 and like reference numerals are used when the states are the same. In FIG. 5, the MS begins from a disconnected state (at least on the WLAN facility) and forms a connection to an AP over the WLAN air interface, makes a secure connection to the SEGW associated with the AP, and forms a TCP connection to the GAN controller associated with the SEGW. The MS again makes a request to connect to a GAN in state 21. In state 22, the MS receives a "request rejected "message from the GAN controller. In state 28, the MS extracts the "reject cause" field from the message. In state 20, a connection status field that is part of the "Request rejected" message is tested. If the connection status is set to a value that corresponds to "maintain," the MS will transition to state 24. If the connection status is set to a value that corresponds to "disconnect," the MS transitions to state 25.

In state 24, the MS acts in the same manner as in the example state diagram of FIG. 2, the WLAN facility remains active; the TCP and SEGW connections are also maintained. In contrast, in the new state 25 of FIG. 5, the MS releases the WLAN, TCP and SEGW connections. By sending an additional status field, the GANC can direct the MS to perform one of these two states. If the GANC indicates that the connection should be disconnected, battery power in the MS will be conserved; as the WLAN facility is not active. Further since the GANC knows the MS will be releasing the secure connection to the SEGW and the TCP connection, the GANC can also release the MS and these resources may be reallocated to another purpose.

In state 26, the MS receives a timer value that is also a field located in the "Request rejected" message the MS received in state 22. In State 23, the MS loads a timer with the value and a random number. Note this is but on alternative to establishing a time, other methods could be used such as just generating a random number, or just loading a value from the GANC, or even using a predetermined value for each load. In FIG. 5 the MS state diagram now transitions to a decrement timer loop of states 27 and 29 as before, when the timer reaches an end condition, typically when it equals 'zero,' the state diagram transitions to state 21 and the request cycle begins again.

The MS begins the next cycle by determining, in state 19, the connection status. That is, if the MS is still connected because the "connection status" field indicated it should "maintain" the connection and the MS transitions from state 20 to 24, then from state 19 the MS can transition to state 21, as the connection is still in place. In contrast, if the connection status field checked in state 20 indicated the MS should disconnect, then it transitioned from state 20 to 25. Now at state 19 the MS should transition to state 17 and again establish the WLAN, SEGW and TCP connections, which were released in state 25. It can then begin the request cycle again.

In contrast to the approaches shown in the state diagrams of FIGS. 2, 3 and 4, the steps illustrated in FIG. 5 advantageously provide a method to conserve the battery power in the MS while the timer is decremented by releasing the WLAN and TCP and SEGW connections to the GANC. The network also is advantageously freed of the connection to the MS during the timer decrementing loop, when on registration is possible; the resources allocated to the MS are then freed for other uses.

Figure 6:
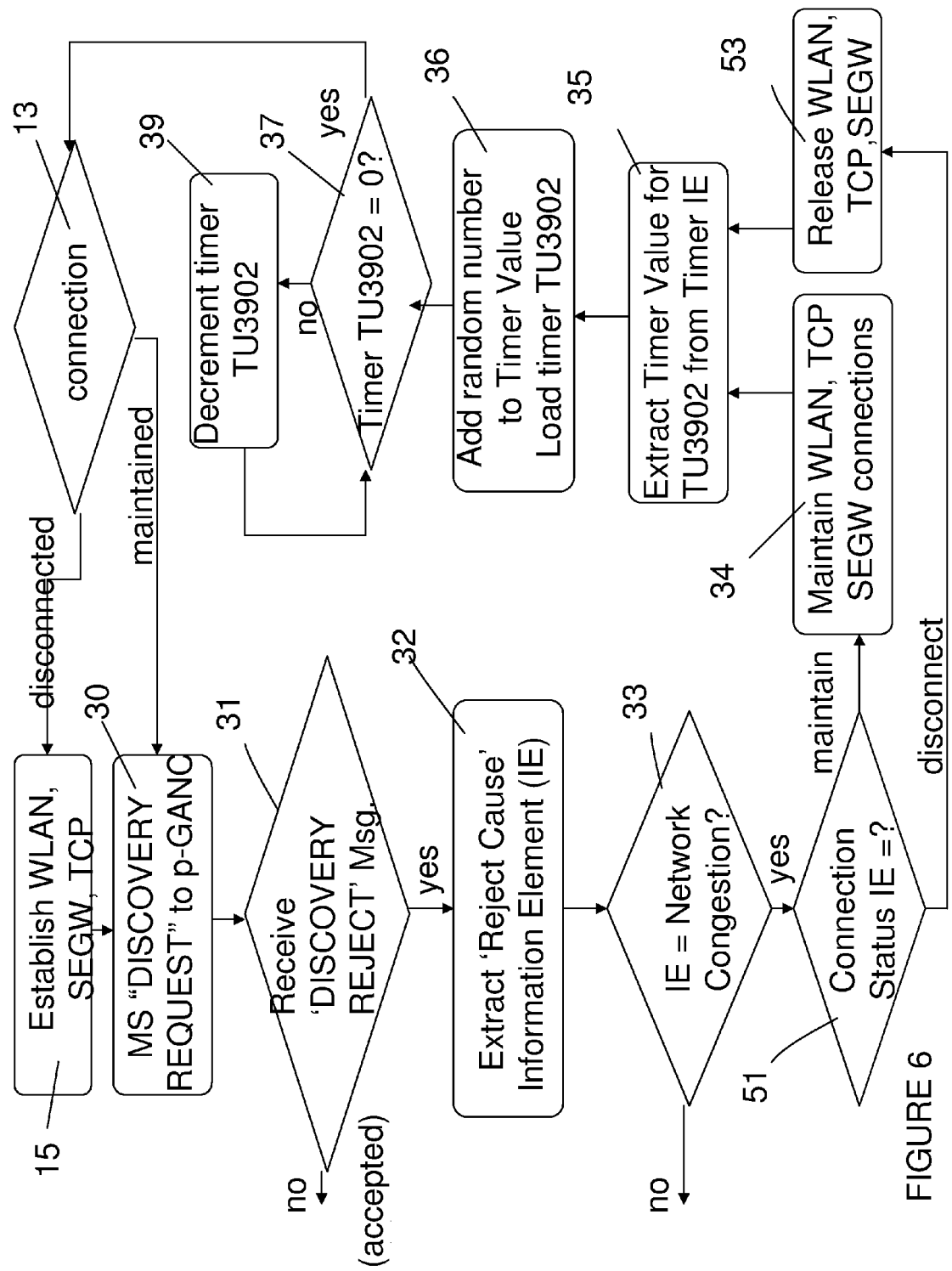
FIG. 6 illustrates in a simplified state diagram an MS performing state transitions for a 3GPP/GAN 'discovery request' in an exemplary embodiment that incorporates features of the present invention.

FIG. 6 depicts a state transition diagram where another exemplary embodiment is shown; in this case, the embodiment is described using the terminology of the 3GPP/GAN protocols. FIG. 6 depicts a MS "DISCOVERY REQUEST" state diagram incorporating the features of the invention.

In FIG. 6 many of the states are the same as for the state diagram of FIG. 3 and like numerals are again used for those states that are the same.

The MS begins in FIG. 6 in a disconnected state and transitions to state 15, where the WLAN, SEGW and TCP connections are made. State 30 in FIG. 6 illustrates the MS sending the "DISCOVERY REQUEST" message to the provisioning GANC. The state diagram then transitions to state 31, where the "DISCOVERY REJECT" message is received. The state diagram then transitions to state 32 where the MS extracts the "reject cause" information element from the message. The state diagram of FIG. 6 then transitions to state 33 where the reject cause IE is tested to determine if the cause field is the value corresponding to "network congestion". In the examples illustrated here the cause is "network congestion" so the state diagram then transitions to state 51.

State 51 is a new state. In state 51, the MS receives a new information element field labeled "connection status." Depending on the value of this field, the MS transitions either to state 34, or to state 53.

If the value in the "connection status" IE field corresponds to "maintain," the MS operates in the same manner as in the state diagram of FIG. 3, the MS transitions to state 34 and maintains the WLAN facility active, the TCP connection to the GANC and the secure connection the SEGW. If however the value in the connection status IE field corresponds to "disconnect" the MS transitions to a new state 53 where it releases the WLAN facility, the TCP connection to the GANC and the secure connection to the SEGW.

In this manner, by providing another IE field with the "network congestion" IE field indicating the "connection status" the MS is to perform, the method of the exemplary embodiment gives the GAN controller the ability to tell the MS when to go ahead and release the connections. The MS can also conserve battery power when the WLAN facility is released. The network can reallocate the resources that were used by the connection to the MS.

Whether the MS transitions to state 34, the "maintain" state, or state 53, the "release" state, the state diagram in FIG. 6 now transitions to states 35, 36, 37 and 39. These states were described above with respect to FIG. 3 and again the MS will receive a timer value for a timer TU3902, add a random value to the received value and load timer TU3902 with the value, and enter a timer decrement loop of states 37 and 39 until the timer reaches its end condition, typically when the timer is decremented to 'zero'. At that time the state diagram transitions to a check connection status state, state 13. If the WLAN, SEGW and TCP connection was maintained and the MS transitioned through state 34, the MS now returns to state 30 and the "DISCOVERY REQUEST" cycle can begin again. If the WLAN, SEGW and TCP connections were released and the MS transitioned through state 53, the MS should now transition to state 15, and establish the WLAN, SEGW and TCP connections before returning to state 30.

The exemplary embodiment allows the GAN controller to indicate to the MS that it can release the WLAN and the connections during the timing loop, before the next registration request is attempted. This approach advantageously improves the power conservation for the MS and the use of network resources for the GANC. Only two additional states were required to the previous approach.

Those skilled in the art will recognize that a few modifications to the existing 3GPP TS 44.318 protocols are needed to implement the exemplary embodiment as part of the standard. In paragraph 5.5.2 "Discovery rejected," the message from the GANC to the MS will contain an additional IE field whenever the "reject cause" of "network congestion" is sent; that is the "connection status" field. A conditional test of the field is then performed by the MS and if the field value indicates "maintain," the connections and the WLAN facility are maintained by the MS. If the value indicates "release," the MS will release the connections and the WLAN facility.

Figure 7:
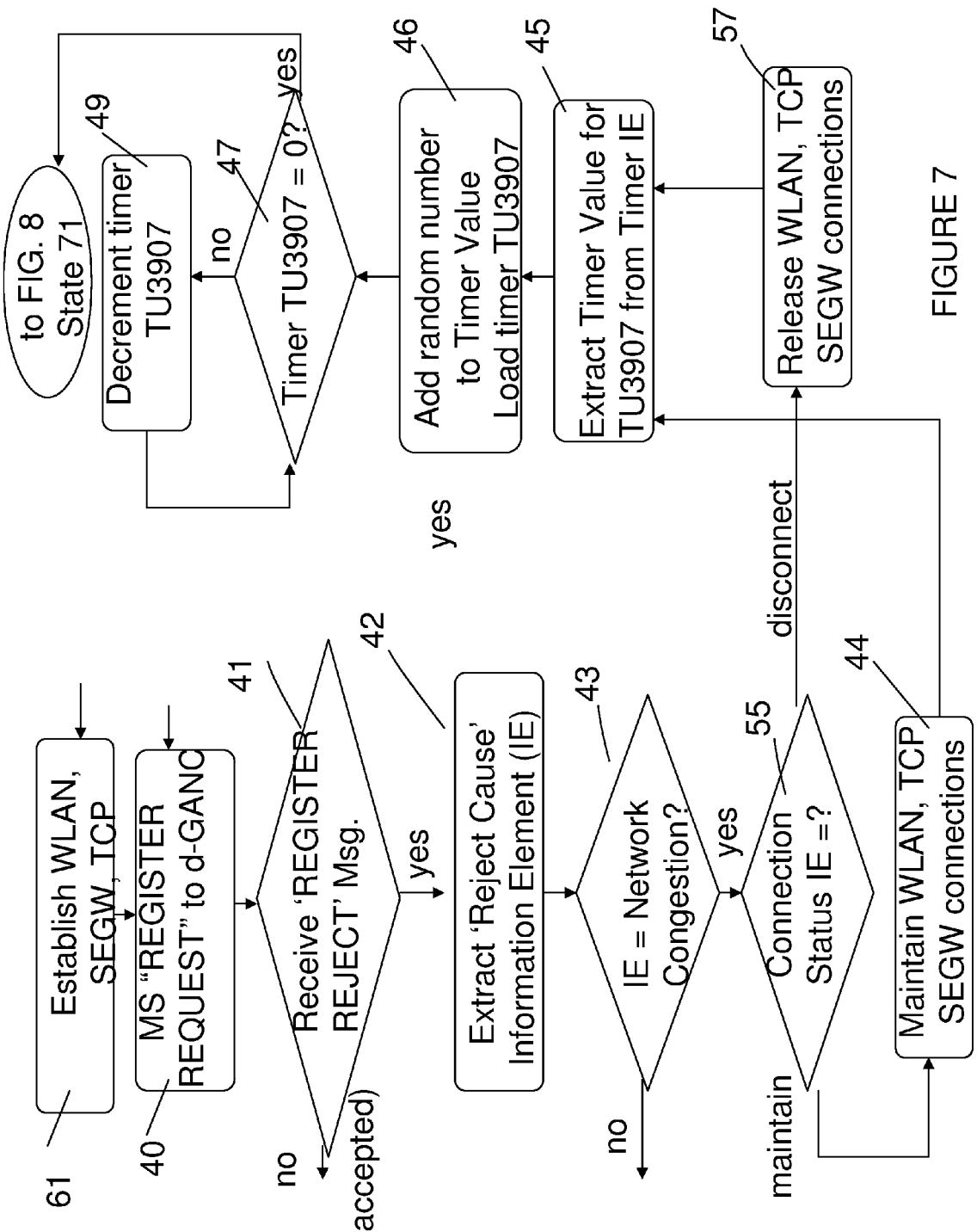
FIGS. 7 and 8 illustrates in a simplified state diagram an MS performing state transitions for a 3GPP/GAN 'register request' in an exemplary embodiment that incorporates features of the present invention.

FIG. 7 illustrates a state diagram for an exemplary embodiment where the features of the invention are incorporated into the 3GPP/GAN protocol for the "REGISTRATION REQUEST". Again this state transition diagram has most states in common with the state diagram of FIG. 4 and so common reference numerals were used for common elements.

In FIG. 7, the MS begins in a disconnected status and in state 61; the MS accesses the AP over the WLAN air interface, and makes a secure connection to the SEGW and a TCP connection to the GAN. The MS then transitions to state 40, where the "REGISTER REQUEST" message is sent to the default GANC. The state diagram then transitions to state 41 where the MS receives, in this example, a "REGISTER REJECT" message. The state diagram transitions to state 42 where the "reject cause" IE is extracted by the MS. The state diagram continues to state 43 where the MS tests the reject cause IE to see if the value corresponds to the condition "network congestion," in this exemplary transaction the condition is met and so the state diagram now transitions to a new conditional state, state 55. In new state 55 the MS tests another information element, the "connection status" IE. If the value of this IE corresponds to "maintain," the state diagram transitions to state 44, and the MS maintains the WLAN facility, the TCP connection to the GANC, and the secure connection to the SEGW. If in contrast the "connection status" IE field contains a value corresponding to "disconnect," the MS transitions to the state 57, another new state, where the MS releases the WLAN facility, the TCP connection and the secure connection to the SEGW.

The rest of the state diagram is the same as for FIG. 4. The MS will receive a timer value from the "register reject" message timer TU3907 IE field, add a random value, load the timer TU3907, and enter states 47 and 49 to perform the timer decrement loop. If the timer TU3907 reaches its end condition, typically 'zero', the state diagram transitions to state 71 in FIG. 8.

Figure 8:
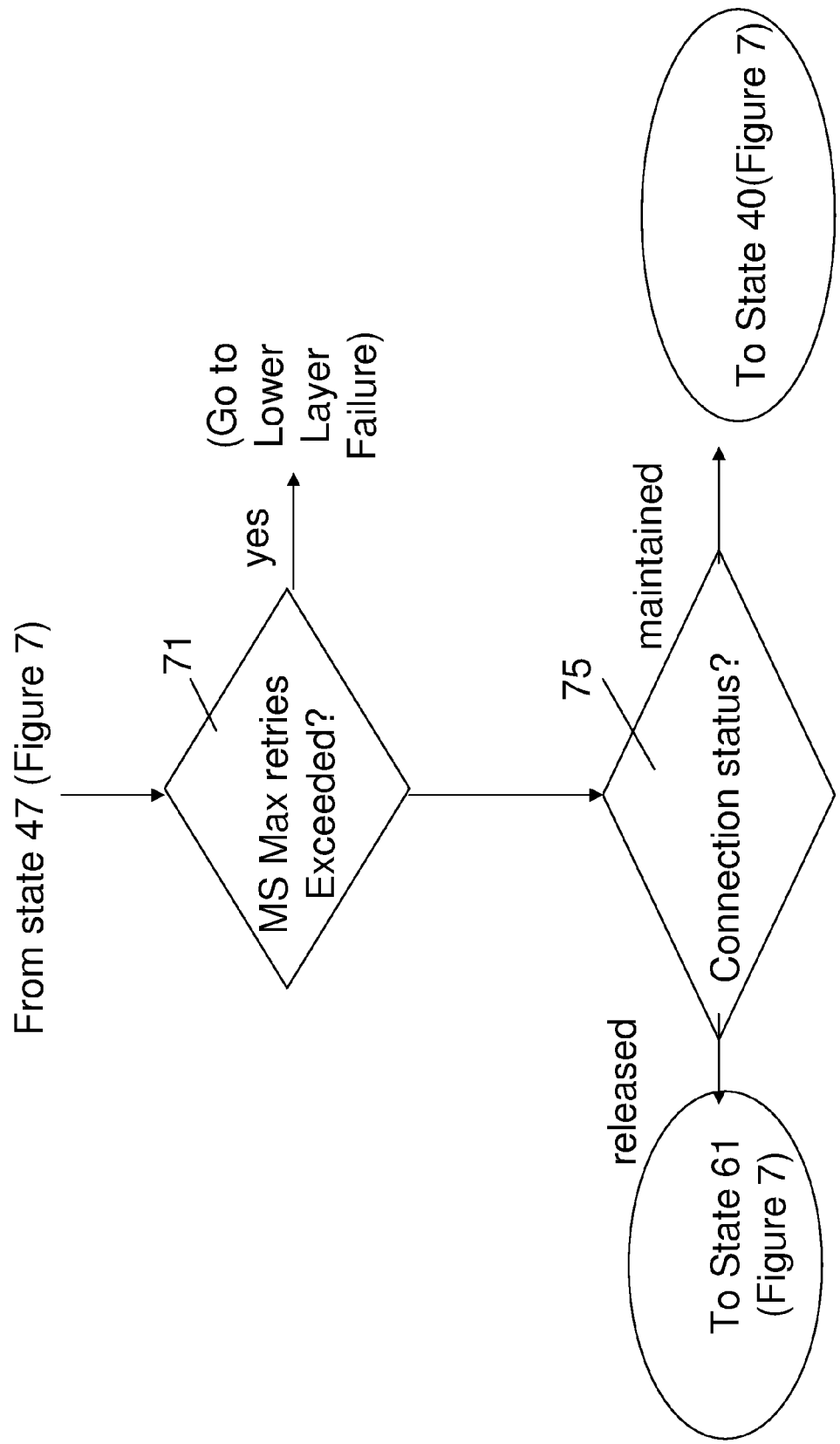

FIG. 8 is presented primarily to simplify the illustration of FIG. 7 and continues the state diagram of FIG. 7. In state 71 the MS again determines whether a maximum retry counter for registration requests has been exceeded, if so, the MS transitions to the "Lower Layer Failure" state and the protocols of paragraph 6.2.4.2 of the TS 44.318 are performed. If the number of registration attempts exceeds a second maximum count, the MS transitions to the "Registration Failure" state and the MS will eventually attempt another 'Discovery Request'.

If the maximum number of retries has not been reached, the state diagram then transitions to state 75. In state 75, the connection status is tested and if the WLAN, SEGW and TCP connection is still active in state 74, the MS transitions to state 40 in FIG. 7 and makes a new request. If instead the connections have been released in state 72, the MS transitions back to state 61 in FIG. 7 and again connects to the WLAN, SEGW and makes a TCP connection to the GAN controller.

In order to perform the exemplary steps within the 3GPP/GAN protocols, the protocols provided in paragraphs 6.2.3.3, where the "reject cause" IE field indicates the condition of "network congestion," may be modified to include an additional IE field of "connection status" when the GANC sends the "network congestion" value in the "reject cause" IE field.

The exemplary embodiment provides the GAN controller a simple method to indicate to the MS that it can release the WLAN facility and the TCP and secure connections during the timing decrement loop, when there is no opportunity to register (until the timer reaches zero). The GAN controller also will know that the MS is going to disconnect (as it sends the "REGISTER REJECT" message and the associated fields, and so it may also release its connections to the MS, freeing network resources for other uses.

In another exemplary embodiment, the generic access resource control ("GA-RC") message from the GANC to the MS, labeled GA-RC DISCOVERY REJECT MESSAGE in the 3GPP/GAN protocols presented in table 10.1.4.1 of the current 3GPP TS 44.318 is modified to provide the additional IE "Connection Status." FIG. 9 depicts an exemplary modified message table including the new IE field, designated as IEI 108. Of course other designations could be used.

In another exemplary embodiment, the GA-RC message from the GANC to the MS, labeled GA-RC REGISTER REJECT message presented in table 10.1.8.1 of the current 3GPP TS 44.318 is modified to provide the additional IE "Connection Status," designated in this exemplary embodiment as IEI 108. Of course other designations could be used. FIG. 10 depicts an exemplary modified message table including the new IE field.

FIG. 11 depicts in an exemplary embodiment a 3 octet IE field for the "connection status" IE. In FIG. 11, the first octet, octet 1 has the connection statue IEI, the second octet labeled octet 2 has the length of the status value contents, and the third octet, labeled octet 3, has the connection status information. The connection status information in this exemplary embodiment is only a two bit field, with one two bit value indicating "maintain" and a different two bit value indicating "release". There are several spare bits and many other status fields can be used, these alternatives are considered additional exemplary embodiments and are contemplated as part of the invention and fall within the scope of the appended claims.

The exemplary embodiments provide methods and circuits to advantageously reduce the battery consumption of an MS attempting to register with a GAN when the registration is requested during times of network congestion. The exemplary embodiments provide a facility for the GAN controller to indicate to the MS that it can release the connections to the GANC and to the SEGW. The network resources allocated to the MS can also be reallocated until the next request.

The exemplary embodiments have been described using state diagrams. An MS implementing the exemplary embodiments may be implemented using programmable logic circuitry such as an application specific integrated circuit ("ASIC"), digital signal processor ("DSP"), reduced instruction set computer ("RISC"), microprocessors ("MPUs"), microcontrollers ("MCCs"), general purpose processors ("GPUs"), and the like. The MS can be implemented using a single IC or several ICs, including mixed signal ICs that incorporate analog to digital converters, analog front end, RF receivers and transmitters, and the like. Memory devices such as dynamic random access memories ("DRAMs"), non-volatile memory such as electrically erasable programmable read only memory ("EEPROM"), flash non-volatile and the like may be incorporated into the MS. Subscriber information memory ("SIM") cards may be used to store information including, for example, the TCPIP addresses needed to communicate to a GAN controller on the wireless LAN.

Figure 12:
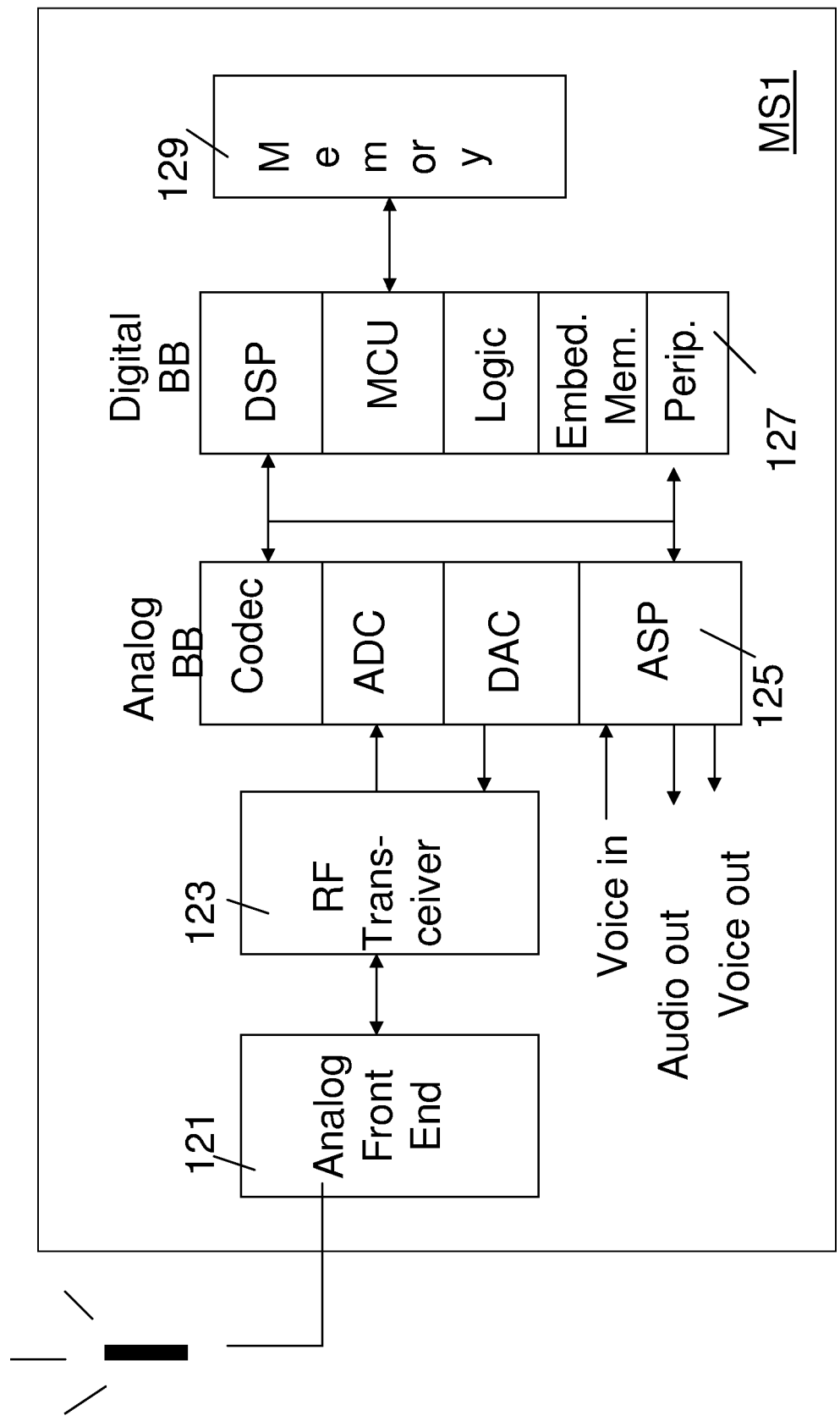
FIG. 12 illustrates in simplified block diagram form an exemplary mobile station circuit implementation that may be used to provide the exemplary embodiments by incorporating features of the invention.

FIG. 12 illustrates a simplified block diagram of a mobile station MS1 that may incorporate one or more of the above embodiments of the invention, and may perform one of the above method embodiments of the invention. In FIG. 12 various blocks are illustrated. In an exemplary embodiment each of these functional blocks may be, for example, produced as an integrated circuit and taken together, these may be considered a "chipset" that is made as a commercially available product for implementing a mobile station. In another exemplary embodiment the blocks may be integrated and two or more of them may be provided as an integrated circuit; eventually as semiconductor process and integrated circuits advance further, the entire MS function including memory may be provided in a single integrated circuit. Certain logical divisions of the blocks are more likely used to create a set of integrated circuits that form the "chipset". Block 121, the analog front end, is coupled to an input terminal that receives RF signals from an antenna. In exemplary embodiments the MS is a "dual band" device and so the AFE and the other blocks are capable of receiving and transmitting over more than one interface. In an exemplary embodiment, the MS is capable of sending and receiving packet data over a wireless LAN interface and also, over a cellular interface such as, for example and without limiting the embodiments, 3GPP, UTRAN or E-UTRAN RF air interfaces. Block 123 performs radio frequency transceiver functions such as carrier wave filtering, low pass filtering, and the like. The analog baseband device 125 provides many of the higher level functions of the device such as analog to digital conversion, certain demodulation/modulation steps, and analog signal processing such as for the voice coder and decoder functions for the phone functions of the mobile station, and often the music player audio or video player video amplifier is provided; these enhanced features are often provided in current technology MS devices.

Block 127 in FIG. 12 is the digital baseband block. This function, which may be an integrated circuit, or multiple integrated circuits, provides for example a digital signal processor for digital modulation/demodulation, a MCU may be included for additional processing, logic circuitry may be included for providing certain functions such as debouncing a keyboard, peripheral circuitry for operating the display and the keyboard, etc. and increasingly frequently embedded memory, such as non-volatile or even dynamic memory is included within the digital baseband Finally memory 129 which includes the SIM card if present, possibly removable storage such as a flash card or compact flash card or thumb drive and the like, and usually some permanent non-volatile storage is provided.

The mobile station MS1 may be configured to perform the exemplary embodiment state diagrams of FIGS. 5, 6, 7 and 8 or any of them in a variety of ways. Typically the digital baseband device is provided with executable instructions to implement the MS functions and the exemplary embodiments may be provided in this manner.

The exemplary embodiments may be also provided in a computer readable storage medium as executable instructions that, when executed, cause a programmable MS to perform the exemplary embodiments. The computer readable storage medium could be a flash drive, CD or DVD ROM, SIM card, memory card or the like; or even a network resource such as a server that can be accessed to copy the stored instructions.

Those skilled in the art will recognize that many obvious modifications to the exemplary embodiments may be made while still using the disclosed inventions. For example, some of the terms used in the foregoing and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims These modifications are contemplated as additional embodiments, are considered as within the scope of the invention and fall within the scope of the appended claims.

What is claimed is:
1. A method, comprising:
  (a) identifying an access point available for connection over an air interface by a radio transceiver mobile station;
  (b) making a secure connection to a gateway over the air interface via the access point;
  (c) using the secure connection, making a connection to a generic access network controller over the air interface;
  (d) making a request to register with the generic access controller;

(e) receiving a request rejected message from the generic access controller;
(f) receiving a rejection cause field from the message;
(g) determining a connection status field from the rejection cause field of the message;
(h) if the connection status field indicates the connection is to be released, releasing the connection to the generic access network controller and the security gateway;
(i) if the connection status field indicates the connection is to be maintained, maintaining the connections to the generic access network controller and the security gateway;
(j) waiting for an elapsed time; and
(k) repeating steps (a)-(i),
wherein (j) waiting for an elapsed time further comprises:
receiving a timer value from the message;
loading a timer TU3902 with the timer value; and
decrementing the timer until the timer reaches an end condition,
wherein the loading of the timer TU3902 with the timer value further comprises:
generating a random number between zero and the timer value;
adding the random number to the timer value to form a sum; and
loading the timer TU3902 with the sum.

2. The method of claim 1 and further comprising:
(l) repeating the steps (a)-(k) until a predetermined maximum number of attempts is reached; and
(m) releasing the connection to the security gateway and to the generic access network controller.

3. The method of claim 1 and further comprising:
(q) after receiving the timer value, generating a random number; and
(r) adding the random number to the timer value before loading the timer.

4. The method of claim 1, wherein (a) identifying an access point available for connection over an air interface by a radio transceiver mobile station further comprises:
identifying wireless lan access point available for a connection over a spread spectrum radio frequency wireless air interface by providing a wireless lan radio transceiver mobile station that further comprises a cellular telephone.

5. The method of claim 1, wherein the mobile station makes a connection to the network via a cellular telephone air interface during (j) waiting for an elapsed time.

6. A method, comprising:
(a) providing a mobile station having a spread spectrum radio transceiver for connecting to a wireless local area network over an air interface via a wireless access point;
(b) identifying an access point available for connection by the mobile station;
(c) making a secure connection to a security gateway via the wireless access point;
(d) making a transmission control protocol connection to a generic access network controller via the secure connection;
(e) sending a message one selected from the group of a 'DISCOVERY REQUEST' message and a 'REGISTER REQUEST' message to the generic access network controller from the mobile station;
(f) receiving in response at the mobile station a respective one of a 'DISCOVERY REJECT' message and a 'REGISTER REJECT' message, respectively, from the generic access network controller;
(g) extracting a 'Reject Cause' information element from the message;
(h) determining that the information element indicates a "network congestion" condition;
(i) extracting a 'Connection Status' information element from the received message;
(j) if the 'Connection Status' indicates "disconnect," releasing the secure connection to the security gateway and the transmission control protocol connection to the generic access network controller;
(k) if the 'Connection Status' indicates "maintain," maintaining the secure connection to the security gateway and the transmission control protocol connection to the generic access network controller;
(l) extracting a Timer Value information element from the received message;
(m) loading a timer TU3902 with the Timer Value; and
(n) repeatedly decrementing timer TU3902 until an end condition is met,
wherein (m) loading a timer TU3902 with the Timer Value further comprises:
generating a random number between zero and the Timer Value;
adding the random number to the Timer Value to form a sum; and
loading timer TU3902 with the sum.

7. The method of claim 6 and further comprising:
(o) if the 'Connection Status' extracted in (i) indicated "disconnect," repeating (c) through (k); and
(p) if the 'Connection Status' extracted in (i) indicated "maintain," repeating steps (e) through (k).

8. The method of claim 6 and further comprising:
(r) extracting a Timer Value information element from the message;
(s) loading a timer TU3907 with the Timer Value; and
(t) repeatedly decrementing timer TU3907 until an end condition is met.

9. The method of claim 8 and further comprising:
(u) if the 'Connection Status' extracted in (k) indicated "disconnect," repeating (c) through (j) and (r) through (t); and
(v) if the 'Connection Status' extracted in (i) indicated "maintain," repeating steps (e) through (k) and (r) through (t).

10. The method of claim 8, wherein (s) loading a timer TU3907 with the Timer Value further comprises:
generating a random number between zero and the Timer Value;
adding the random number to the Timer Value to form a sum; and
loading timer TU3907 with the sum.

11. The method of claim 9, and further comprising:
repeating (u) and (v) until a maximum retries count is exceeded; and
releasing the secure connection to the security gateway and the transmission control protocol connection to the generic access network controller.

12. The method of claim 6 and further comprising:
identifying a network element available for connection over a spread spectrum radio frequency air interface via a cellular telephone network; and
connecting the mobile station to the network element using a spread spectrum radio frequency transceiver in the mobile station.

13. The method of claim 6, wherein the wireless local area network is an 802.11 compliant wireless local area network.

14. The method of claim 6, wherein the wireless local area network is Bluetooth compliant.

15. The method of claim 6, wherein the generic access network controller is a provisioning generic access network controller.

16. The method of claim 6, wherein the generic access network controller is a default generic access network controller.

17. The method of claim 6, wherein the mobile station provides an address for the generic access network controller stored in a SIM card.

18. An apparatus, comprising:
a radio frequency circuit configured to transmit and receive spread spectrum radio frequency signals over an air interface to and from a WLAN access point;
security gateway connection circuitry configured to make a secure connection to a security gateway via the access point over the air interface;
generic access connection circuitry configured to make a transmission control protocol connection to a generic access network controller over the security gateway connection;
message send circuitry configured to send a message one selected from the group of 'DISCOVERY REQUEST' and 'REGISTER REQUEST' to the generic access network controller over the air interface;
message receive circuitry configured to receive a message one selected from the group of 'DISCOVERY REJECT' and 'REGISTER REJECT' from the generic access network controller over the air interface;
information element extraction circuitry configured to extract a "reject cause" information element from a received message;
information element extraction circuitry configured to extract a "connection status" information element from a received message containing a "reject cause,"
determination circuitry configured to determine if the "connection status" information element indicates a "maintain" or a "disconnect" status;
maintain connection circuitry configured to maintain the secure connection and the transmission control protocol connection if the determination circuitry indicates a "maintain" status; and
release connection circuitry configured to release the secure connection and the transmission control protocol connection if the determination circuitry indicates a "disconnect" status; and
a timer circuit configured to load a timer TU3902 with a timer value from the request rejected message received,
wherein the apparatus is configured to decrement the timer circuit until an end value is reached,
wherein the timer circuit is configured to load the timer TU3902 with the timer value by:
generating a random number between zero and the timer value;
adding the random number to the timer value to form a sum; and
loading the timer TU3902 with the sum.

19. The apparatus of claim 18 and further comprising:
timer circuitry configured to decrement a timer value responsive to a control signal; and
comparison circuitry configured to indicate when the timer value reaches an end value.

20. The apparatus of claim 18 and further comprising:
a second radio frequency receiver circuit configured to receive spread spectrum modulated signals over an air interface from a network element;
wherein the second radio frequency receiver circuit selectively operates simultaneously with the radio frequency receiver circuit.

21. An apparatus comprising:
an analog front end circuit configured to receive spread spectrum modulated radio frequency signals;
a radio frequency receiver circuit configured to receive analog signals from the analog front end;
an analog baseband circuit configured to receive analog signals from the radio frequency receiver and performing analog to digital conversion; and
a digital baseband circuit configured to receive digital signals from the analog baseband circuit;
wherein the digital baseband circuit receives a request rejected message from a generic access network controller, determines a reject cause field received in the message is indicating a network congestion condition, determines a connection status field received in the request rejected message, and based on the value of the connection status field being a first value releases a connection to the generic access controller; and
a timer circuit configured to load a timer TU3902 with a timer value from the request rejected message received,
wherein the apparatus is configured to decrement the timer circuit until an end value is reached,
wherein the timer circuit is configured to load the timer TU3902 with the timer value by:
generating a random number between zero and the timer value;
adding the random number to the timer value to form a sum; and
loading the timer TU3902 with the sum.

22. The apparatus of claim 21, wherein the digital baseband circuit is a single integrated circuit.

23. The apparatus of claim 21, wherein the analog baseband circuit is a single integrated circuit.

24. The apparatus of claim 21, wherein the digital baseband circuit is a digital signal processor.

25. The apparatus of claim 21, wherein the analog front end, the radio frequency receiver, and the analog baseband circuit are disposed on a first single integrated circuit.

26. The apparatus of claim 25, wherein the digital baseband circuit is a second single integrated circuit so that the combination of the first and second single integrated circuits form a mobile station chipset.

27. A non-transitory computer readable storage medium containing executable instructions that, when executed by a programmable mobile station having a spread spectrum radio transceiver for connecting to a wireless lan over an air interface via a wireless access point perform:
(a) identifying an access point available for connection by the mobile station;
(b) making a secure connection to a security gateway via the access point;
(c) making a transmission control protocol connection to a generic access network controller via the secure connection;
(d) sending a message one selected from the group of a 'DISCOVERY REQUEST' message and a 'REGISTER REQUEST' message to the generic access network controller from the mobile station;
(e) receiving in response at the mobile station a respective one of a 'DISCOVERY REJECT' message and a 'REGISTER REJECT' message, respectively, from the generic access network controller;
(f) extracting a 'Reject Cause' information element from the message;

(g) determining that the information element indicates a "network congestion" condition;

(h) extracting a 'Connection Status' information element from the message;

(i) if the 'Connection Status' indicates "disconnect," releasing the secure connection to the security gateway and the transmission control protocol connection to the generic access network controller; and (j) if the 'Connection Status' indicates "maintain," maintaining the secure connection to the security gateway and the transmission control protocol connection to the generic access network controller;

(k) extracting a Timer Value information element from the message;

(l) loading a timer TU3902 with the Timer Value; and (m) repeatedly decrementing timer TU3902 until an end condition is met, wherein (l) loading a timer TU3902 with the Timer Value further comprises:

generating a random number between zero and the Timer Value;

adding the random number to the Timer Value to form a sum; and loading timer TU3902 with the sum.

28. The non-transitory computer readable storage medium of claim 27 and further comprising instructions that, when executed by the programmable mobile station, perform:

(n) if the 'Connection Status' extracted in (i) indicated "disconnect," repeating (b) through (m); and (o) if the 'Connection Status' extracted in (h) indicated "maintain," repeating steps (d) through (m).

29. An apparatus, comprising:

receiver circuitry configured to receive a message one selected from the group of 'DISCOVERY REJECT' and 'REGISTER REJECT' from a generic access network controller over the air interface of a wireless access point;

extraction circuitry configured to extract a "reject cause" information element from the received message;

the extraction circuitry further configured to extract a "connection status" information element from a received message containing a "reject cause,"

determining circuitry configured to determine if the "connection status" information element indicates a "maintain" or a "disconnect" status;

maintaining circuitry configured to maintain a secure connection, and a transfer control protocol connection to the generic access network controller if the determining indicates a "maintain" status; and means for releasing the secure connection and the transfer control protocol connection if the determining circuitry indicates a "disconnect" status; and a timer circuit configured to load a timer TU3902 with a timer value from the received message containing the "reject cause" information element, wherein the apparatus is configured to decrement the timer circuit until an end value is reached, wherein the timer circuit is configured to load the timer TU3902 with the timer value by:

generating a random number between zero and the timer value;

adding the random number to the timer value to form a sum; and loading the timer TU3902 with the sum.

\* \* \* \* \*